United States Patent Office 3,510,541
Patented May 5, 1970

3,510,541
MODIFIED AMIDE INTERPOLYMER COATING
COMPOSITIONS
Erwin J. Kapalko and Richard A. Martin, Delaware,
Ohio, assignors to PPG Industries, Inc., a corporation
of Pennsylvania
No Drawing. Filed Sept. 21, 1967, Ser. No. 669,411
Int. Cl. C08g 45/08, 45/10
U.S. Cl. 260—831         11 Claims

ABSTRACT OF THE DISCLOSURE

Coating compositions having outstanding detergent resistance and other improved properties are provided by a combination of an interpolymer of an unsaturated carboxylic acid amide and one or more other ethylenic monomers, and a methylol phenol ether composition of the formula

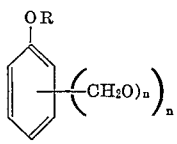

where $n$ is 1 to 3 and R is an unsaturated aliphatic group or a halogenated derivative of such a group. The amide interpolymer is modified by reaction of the amide groups with an aldehyde and preferably these groups are further reacted with an alcohol. The properties of these coating compositions make them highly useful on appliances such as laundry equipment, particularly as primers.

---

Various compositions comprising interpolymers of unsaturated carboxylic acid amides, and especially aldehyde-modified and etherified interpolymers of such amides with other ethylenically unsaturated monomers, have been utilized extensively in coatings. A number of such interpolymers which have found wide acceptance in the coatings field are disclosed, for example, in U.S. Pat. No. 3,037,963. These interpolymers are employed alone or, more usually, in combination with other resins, and are utilized as clear films or as resinous vehicles for primers, enamels and other thermosetting compositions. When so used, such compositions provide highly desirable coatings having excellent properties, including, for instance, good adhesion, chemical resistance, mar resistance, etc.

However, although compositions comprising these interpolymers provide coatings having outstanding overall properties which make them highly desirable for many applications, for some uses they have certain disadvantages. For example, when formulated so as to provide optimum properties of certain types, they tend to be deficient in other properties. One especially troublesome property is detergent resistance, which means the ability to withstand hot solutions of detergents without degrading the coating or the substrate. Detergent resistance is an extremely important property in any coating for use on laundry equipment or other appliances.

It has now been found that coating compositions having particularly good properties, including unexpectedly outstanding detergent resistance, are obtained by combining the aforesaid amide interpolymers with a composition consisting essentially on one or more methylol phenol ethers. Such coating compositions provide numerous advantages, including, as mentioned, exceptional detergent resistance, as well as improved adhesion to many substrates such as aluminum and better salt-spray resistance, and provide these advantages without detracting from other properties. The excellent properties of the coating compositions herein make them especially useful as primers and other coatings for laundry equipment and similar appliances in which the high degree of detergent resistance they provide is particularly desirable.

The amide polymer component of the compositions of this invention can be any aldehyde-modified polymer of an unsaturated carboxylic acid amide; the aldehyde-modified interpolymer is preferably at least partially etherified. Aldehyde-modified amide polymers are obtained by polymerizing an unsaturated amide and at least one ethylenically unsaturated monomer and reacting the initial product of the polymerization with an aldehyde. Etherification is carried out by further reaction of the aldehyde-modified interpolymer with an alcohol. Alternatively, aldehyde-modified interpolymers are produced by interpolymerizing an aldehyde-modified amide, such as an alkylol amide, which may be then etherified, or by employing an N-alkoxyalkyl amide.

In either case, the aldehyde-modified etherified amide polymer contains amido groups having a hydrogen atom replaced by the structure:

where R is hydrogen or an alkyl radical and $R_1$ is hydrogen or an organic radical.

Methods for producing N-alkoxyalkyl-substituted unsaturated carboxylic acid amides, such as N-butoxymethyl acrylamide are disclosed in U.S. Pat. Nos. 3,079,434 and 3,087,965. When these and similarly substituted unsaturated carboxylic acid amides are polymerized, the resulting reaction product contains the aforesaid structure without any further treatment.

If, however, the unsaturated carboxylic acid amide does not contain such a structure, i.e., an unsubstituted amide is employed, the resulting amide polymer should be reacted with an aldehyde whereby such structure in which $R_1$ is hydrogen is produced by reaction of the aldehyde with an amido hydrogen atom to produce a hydroxyorgano group. When the aldehyde-modified product is also reacted with an alcohol, etherification of the hydroxyorgano groups by the alcohol takes place.

It is desirable to etherify at least part, and in many cases at least about half, of the hydroxyorgano groups of those amide interpolymers produced from unsubstituted or alkylol amides. Otherwise, problems of storage stability or premature gelation and flexibility of the coating may be encountered.

After etherification, the amide polymer contains amido groups having a hydrogen atom replaced by the structure:

where R is hydrogen when the aldehyde employed is formaldehyde and an alkyl radical when other aliphatic aldehydes are used. $R_1$ represents the radical derived by removing a hydroxyl group from the etherifying alcohol, i.e., an organic radical, or in those groups not etherified, represents hydrogen. $R_1$ in the etherified groups can be, for example, alkyl or aryl. The terms "alkyl" and "aryl" as employed herein, are to be construed broadly; the groups represented by $R_1$ may include other substituents and functional groups which do not affect the properties of the product. Thus, $R_1$ may include unsaturated linkages, ether linkages, halogens and other substituents, or it may be cyclic.

Satisfactory products may in some instances be obtained with only a very small part of the hydroxyorgano groups having been etherified, in some instances 5 percent or less, but as mentioned, it is usually desirable that at least about 50 percent of the hydroxyorgano groups be etherified. Butanol is a preferred alcohol for use in the etherification, although any monohydric alcohol, such as methanol, ethanol, propanol, pentanol, octanol, decanol, and other alkanols containing up to about 20 or more carbon atoms, may also be employed, as may aromatic alcohols, such as benzyl alcohol; or cyclic alcohols, such as cyclohexanol; or the monoethers of glycols, such as butyl Cellosolve (ethylene glycol monobutyl ether), butyl Carbitol (diethylene glycol monobutyl ether), and other Cellosolves and Carbitols; or substituted alcohols, such as 3-chloropropanol.

While either acrylamide or methacrylamide is preferred for use in forming the interpolymer component, any polymerizable unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid and esters thereof, and imide derivatives such as N-carbamyl maleimide, may also be utilized. Preferably, the interpolymer should contain from about 2 to about 50 percent by weight of the amide, the balance being the other ethylenic monomer or monomers.

At least one other unsaturated monomer is interpolymerized with the unsaturated carboxylic acid amide; any polymerizable ethylenically unsaturated monomer can be so utilized. Such monomers include monoolefinic and diolefinic hydrocarbons, unsaturated esters of organic and inorganic acids, esters of unsaturated acids, nitriles, unsaturated acids, and the like. The interpolymer compositions described in U.S. Pat. Nos. 2,978,437 and 3,307,963 are excellent examples of the preferred type of amide polymers utilized in the instant invention, and the many unsaturated compounds disclosed therein illustrate the numerous monomers which can be interpolymerized along with the amide. The polymerization reaction to form the amide interpolymer is also described in the aforesaid patents, and is ordinarily carried out using a free-radical initiator, such as a peroxygen type catalyst, and a mercaptan or other chain-stopping agent.

When necessary to produce the desired structures, the amide groups are reacted with an aldehyde, preferably in the presence of an alcohol and a mild acid catalyst, such as maleic anhydride. Formaldehyde, or a formaldehyde-yielding substance, is greatly preferred, but other aldehydes, such as acetaldehyde, butyraldehyde, and the like, can be used. It is ordinarily preferred to utilize about 2 equivalents of aldehyde for each amide group present in the interpolymer, although the ratio may be as high as 3.0 equivalents or as low as about 0.2 equivalent of aldehyde for each amide group.

In producing the coating compositions of the invention, the above amide interpolymers are combined with a methylol phenol ether composition consisting essentially of one or more methylol phenol ethers of the formula

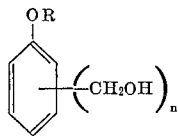

where $n$ is an integer from 1 to 3 and R is an unsaturated aliphatic group or a halogen-substituted unsaturated aliphatic group. The groups represented by R should contain at least 3 carbon atoms and can be, for example, allyl groups (which are preferred) or others such as methallyl, crotyl, butenyl, or the like. The halogen-substituted unsaturated groups represented by R can be various mono- and poly-halogenated derivatives of the above unsaturated aliphatic groups, for example 2-chloroallyl, 3-chloroallyl, 3-chloro-2-methylallyl, 1-chloro-2-butenyl, and corresponding groups containing other halogens such as bromine or fluorine.

The methylol phenol ether compositions employed herein are described in U.S. Pat. 2,579,330, and as disclosed therein can be produced from sodium or barium salts of 2,4,6-tris(hydroxy methyl)phenols which are obtained by reacting formaldehyde with phenol in the presence of sodium or barium hydroxide. Several methylol phenol ether compositions of this type are commercially available and these generally comprise mixtures of allyl ethers of mono-, di- and trimethylol phenols (substituted in the ortho, para and metal positions). The trimethylolated derivative is generally the predominant component of the composition. Such commercially available methylol phenol ether compositions are preferred for use in the invention.

The proportions of the methylol phenol ether composition and the amide interpolymer in the coating composition can be varied considerably. The optimum amount employed depends upon the particular properties desired in the product, and also depends in part upon the particular amide interpolymer employed, i.e. the type of monomers in the interpolymer in addition to the amide. In most instances, compatibility of the components must be considered although for some purposes some degree of incompatibility can be tolerated. In the preferred products, the methylol ether composition comprises from about 3 to about 25 percent of the total weight of the methylol phenol ether and amide interpolymer, although as little as 1 percent gives some degree of improvement in the properties of the amide interpolymer coating composition and as much as 50 percent or even higher can be utilized in some cases.

In the ordinary case the amide interpolymer is first produced and then combined with the methylol phenol ether composition. Heating of the mixture can be carried out although it is not usually necessary. When mixed in this manner it is not known with certainty whether any coreaction takes place between these components, but some reaction may take place either prior to or during curing. It is also possible to add the methylol phenol ether composition during the polymerization of the amide interpolymer components, and thereby provide additional opportunity for some degree of interreaction. Also, if desired the monomers employed in the amide interpolymer can include monomers containing reactive sites which can more easily react with the methylol phenol ethers.

In addition to the amide interpolymer and the methylol ether composition, the coating compositions herein ordinarily contain several additive components to provide the desired overall combination of properties. Such additive materials are those ordinarily utilized with the amide interpolymers of the class herein and these can include, for instance, epoxy resins, amine resins, and other resinous materials, as well as various plasticizers and materials to decrease the required curing temperatures, such as acids or adducts of maleic anhydride with hydroxyl-containing polymers.

Various pigments are also usually included to provide colored finishes as desired.

The coating compositions described herein are particularly useful as thermosetting primers for appliances such as laundry equipment, where detergent resistance is an important property. These coating compositions can also be used for topcoats or as one coat finishes, although they have a tendency to yellow somewhat during baking and therefore are less suited for topcoats where a white finish is desired. Used as a primer, however, with virtually any topcoat material, and especially with topcoats made from coating compositions based on the amide interpolymers described, they provide a hitherto unattainable combination of properties. Thus, in addition to outstanding detergent resistance they impart improved adhesion to the substrate, particularly metals, such as aluminum, and also improved intercoat adhesion to the topcoat. In addition, they give coatings with excellent salt-spray resistance and other such properties.

The coating compositions herein can be applied by any conventional application method, such as by electrostatic or conventional spraying, roll coating, brushing and the like. Ordinarily, the composition includes one or more solvents, and the choice of solvents and the concentration of the resinous components in the solvent mixture are chosen with reference to the desired manner in which the composition is to be applied. The compositions are usually applied to metal substrates such as sheet aluminum, phosphatized steel, copper, etc., but can also be utilized on other materials, such as wood, glass, plastics, and the like.

After application, the compositions are ordinarily dried and cured by baking at elevated temperatures to produce a hard, infusible film. The baking schedules employed also depend upon the nature of the particular composition, the nature of the substrate, and the manner in which it is to be used. The inclusion of an acid monomer in the amide polymer, or addition of various agents will lower the effective curing temperature. Generally speaking, baking temperatures of at least 200° F. and preferably 300° F. are employed, and the ordinary baking schedule is between 325° F. and 425° F. for 10 to 40 minutes. In some cases, curing can be carried out by other techniques not requiring such elevated temperatures.

Set forth below are several examples giving the compositions of several amide interpolymers that can be employed in the invention. These amide interpolymers are produced by known procedures. In a typical procedure, the reactive monomers are charged into a reaction vessel along with solvent, a mercaptan or other chain-modifying agent, and catalyst. The amount of catalyst added initially is generally 1 percent by weight of the reactive monomers. This mixture is refluxed for 8 hours, with 0.5 percent portions of additional catalyst being added after the second, fourth, sixth and eighth hours. There are then added an aldehyde and an alcohol (usually butyl Formcel, which is a 40 percent solution of formaldehyde in n-butanol), along with maleic anhydride or a similar mild acid catalyst and additional solvent. This mixture is then refluxed for 3 hours while removing water azeotropically. The product is cooled and sufficient solvent added to produce a solution of the desired nonvolatile solids content. (In the examples and throughout the specification all parts and percentages are based upon weight and non-volatile solids content, unless otherwise indicated.)

EXAMPLE A

An interpolymer is produced from the following reactive monomers:

| | Parts by wt. |
|---|---|
| Acrylamide | 30.0 |
| Styrene | 262.5 |
| Methacrylic acid | 7.5 |

The above are polymerized using a total of 9 parts of cumene hydroperoxide catalyst and 3.75 parts of tertiary dodecyl mercaptan, and the polymer is further reacted with 63.6 parts of butyl Formcel in the presence of 0.8 part of maleic anhydride. The polymer solution produced has a solids content of 50 percent and a Gardner-Holdt viscosity of V to W, in a solvent mixture of 32.5 percent butanol, 22.5 percent xylene and 45.0 percent toluene.

EXAMPLE B

The monomers employed in making the interpolymer of this example are as follows:

| | Parts by wt. |
|---|---|
| Acrylamide | 10.0 |
| Styrene | 87.5 |
| Methacrylic acid | 2.5 |

The polymer is produced using 3.5 parts of cumene hydroperoxide and 3 parts of tertiary dodecyl mercaptan, and is further reacted with 21.2 parts of butyl Formcel in the presence of 0.27 part of maleic anhydride. The product has a solids content of 49 percent and a Gardner-Holdt viscosity of Q+, in a solvent mixture of 32.5 percent butanol, 22.5 percent xylene and 45 percent high boiling aromatic naphtha (boiling range 187–205° C.).

EXAMPLE C

The following monomers are employed in this example:

| | Parts by wt. |
|---|---|
| Acrylamide | 35.1 |
| Methacrylic acid | 8.8 |
| Styrene | 212.4 |
| Methyl methacrylate | 94.8 |

These are reacted in the presence of a total of 10.5 parts of cumene hydroperoxide and 10.5 parts of tertiary dodecyl mercaptan. The polymer is modified by reaction with 74.4 parts fo butyl Formcel and 0.93 part of maleic anhydride. The product has a Gardner-Holdt viscosity of T to U and a solids content of 51 percent, in a solvent mixture containing 25 percent butanol, 25 percent xylene and 50 percent toluene.

EXAMPLE D

In this example, the following monomers are employed:

| | Parts by wt. |
|---|---|
| Acrylamide | 27.0 |
| Methacrylic acid | 6.75 |
| Hydroxyethyl methacrylate | 13.5 |
| Methyl methacrylate | 65.0 |
| Styrene | 104.0 |
| 2-ethyl hexyl acrylate | 54.0 |

A total of 8.1 parts of cumeen hydroperoxide and 4.1 parts of tertiary dodecyl mercaptan are utilized in carrying out the reaction, and the polymer produced is modified by reaction with 57.0 parts of butyl Formcel in the presence of 0.72 part of maleic anhydride. The solvents employed are 135 parts of butanol and 135 parts of xylene, giving a product having a solids content of about 50 percent and a Gardner-Holdt viscosity of W to Y.

EXAMPLE E

An interpolymer is prepared from a mixture of the following components:

| | Parts by wt. |
|---|---|
| N-butoxymethyl acrylamide | 198 |
| Styrene | 231 |
| Ethyl acrylate | 264 |
| Methacrylic acid | 15 |
| Butanol | 354 |
| Toluene | 354 |

The above mixture is refluxed for 2 hours in the presence of 7 parts of cumene hydroperoxide and 7 parts of tertiary dodecyl mercaptan, and then for three more successive 2-hour reflux periods, after each of which were added 3.5 parts of cumene hydroperoxide. During the last two reflux periods, the formed water was removed by azeotropic distillation. The resulting resinous product has a solids content of 50 percent and a Gardner-Holdt viscosity of T to U.

The above amide interpolymers and methylol phenol ether compositions are formulated into coating compositions having the desirable properties described herein, as illustrated by the following:

EXAMPLE 1

In this example, a commercially available methylol phenol ether composition was employed, known as Methylon 75108. It is essentially a mixture of the allyl ethers of mono-, di- and trimethylol phenols, with the trimethylol derivatives predominating, and has the following properties:

Solids content—100 percent
Viscosity (25° C.)—2000–4000 centipoises
Pounds per gallon—10
Percent reactive—99

This methylol phenol ether composition was used to form a coating composition by mixing the following:

| | Parts by wt. |
|---|---|
| Amide interpolymer composition of Example A (50 percent solids) | 245 |
| Methylol phenol ether composition | 9 |
| Epoxy resin [1] (65 percent solids) | 147 |
| Amine resin [2] (50 percent solids) | 56 |
| Pigment paste | 468 |
| Diacetone alcohol | 127 |

[1] Toluene solution of reaction product of bisphenol A and epichlorohydrin having epoxide equivalent of 450–525 and molecular weight of 900–1000 (Epon 1001).
[2] Butylated urea-formaldehyde resin made from 2.2 moles of formaldehyde and 1.6 moles of butanol per mole of urea, solution in 50/50 butanol-xylene.

The pigment paste employed in the above coating composition had the following composition:

| | Parts by wt. |
|---|---|
| Amide interpolymer composition of Example A (50 percent solids) | 117 |
| Titanium dioxide | 304 |
| Aromatic naphtha (B.P. 160–173° C.) | 47 |

The coating composition was reduced to a viscosity of 18.4 seconds (#2 Zahn cup) with a 75/25 mixture of high boiling aromatic naphtha (B.P. 187–205° C.) and diacetone alcohol and applied to calcium-zinc phosphate treated steel panels to give a 0.3 mil thick dry film. For comparison, another such panel was coated with a coating composition made in the same manner except that the methylol phenol ether composition was omitted. Both panels were baked at 425° F. for 15 minutes and evaluated by a commercially used detergent resistance test involving exposure to a 1½ percent detergent solution in distilled water at 165° F. The panel containing the coating made in accordance with the present invention had only slight blistering after 500 hours and was considered to satisfactorily pass the test for this period, whereas the comparison panel (without the methylol phenol ether composition) failed the test, being badly blistered and peeled with loss of adhesion.

EXAMPLE 2

A coating composition was produced as in Example 1 except that the only resinous components were as follows:

| | Percent by wt. |
|---|---|
| Amide interpolymer composition of Example B (49 percent solids) | 84.75 |
| Methylol phenol ether composition (as in Example 1) | 15.25 |

Coatings of this composition, made as above and baked at 350° F. for 30 minutes, successfully passed the detergent resistance test described above for a period of 240 hours, whereas coatings made in the same way but without the methylol phenol ether composition fail in 100 hours or less.

EXAMPLE 3

A coating composition was produced as in Example 2 except that the vehicle contained 90 percent of the amide interpolymer composition and 10 percent of the methylol phenol ether. When tested as above, some blistering took place in 240 hours but the coating still passed the test for this period.

EXAMPLE 4

Following the foregoing procedures, a coating composition was produced using the following resinous vehicle:

| | Parts by wt. |
|---|---|
| Amide interpolymer composition of Example B (49 percent solids) | 82.5 |
| Methylol phenol ether composition (as in Example 1) | 10.0 |
| Epoxy resin solution (as in Example 1) | 7.5 |

Coatings produced from this composition when tested in the foregoing manner had no blisters after 240 hours in the detergent solution at 165° F.

In these and other tests it has been shown that incorporation of methylol phenol ethers in coating compositions based upon the amide interpolymers, as described, not only invariably greatly increases the detergent resistance of the resulting coatings, but also provides coatings having the basic, highly desirable quality of the amide interpolymer coating as known heretofore. Good results are obtained not only with compositions as specifically exemplified but with other compositions employing, for instance, other methylol phenol ethers of the class disclosed, as well as other amide interpolymers, such as those of Examples C, D and E herein.

Also, while it is preferred to employ minor amounts (e.g. up to 30 percent of the resinous vehicle) of epoxy resins, such as those described and others as disclosed, for instance, in U.S. Pats. 2,870,117 and 3,315,011, or amine resins (i.e. amino-aldehyde resins such as benzoguanamine-formaldehyde, urea-formaldehyde and melamine-formaldehyde resins, some of which are described in U.S. Pat. 3,050,495), such additive materials can be omitted, or other added or coreacted materials can be included. Such other materials can be, for example, hydroxyl-containing polymers or their adducts, as in U.S. Pats. 3,118,852 and 3,118,853; organopolysiloxanes, for instance, those in U.S. Pat. 3,261,881; alkyds, as in U.S. Pat. 2,940,945; and others.

According to the provisions of the patent statutes, there are described above the invention and what are now considered to be its best embodiments. However, within the scope of the appended claims, it is to be understood that the invention can be practiced otherwise than as specifically described.

What is claimed is:
1. A resinous coating composition comprising
   (1) an interpolymer of from about 2 to about 50 percent by weight of an unsaturated carboxylic acid amide and at least one other polymerizable ethylenically unsaturated monomer, said interpolymer being chracterized by containing amido groups having a hydrogen atom replaced by the structure:

where R is selected from the group consisting of hydrogen and lower alkyl radicals, and $R_1$ is selected from the group consisting of hydrogen and organic radicals, and
   (2) from about 1 to about 50 percent, based on the total weight of (1) and (2) herein, of a methylol phenol ether composition consisting essentially of one or more methylol phenol ethers of the formula

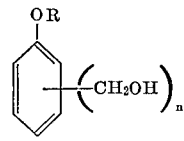

where $n$ is an integer from 1 to 3 and R is an unsaturated aliphatic group or a halogen-substituted unsaturated aliphatic group, the trimethylolated derivative being predominant in said methylol phenol ether composition.

2. The composition of claim 1 in which said interpolymer is characterized by containing amido groups having a hydrogen atom replaced by the structure:

where $R_1$ is lower alkyl.

3. The composition of claim 2 in which said unsaturated carboxylic acid amide is acrylamide.

4. The composition of claim 2 in which said structure is a butoxymethyl group.

5. The composition of claim 2 in which at least about 50 percent of the amido groups have a hydrogen atom replaced by the structure:

—CH$_2$OR$_1$ where R$_1$ is lower alkyl.

6. The composition of claim 1 in which said methylol phenol ether composition consists essentially of a mixture of allyl ethers of mono-, di-, and tri-methylol phenols.

7. The composition of claim 1 in which there is included as an added resinous component up to about 30 percent by weight of the resinous vehicle of an epoxy resin, an amine resin or both.

8. A resinous coating composition comprising
(1) an interpolymer of from about 2 to about 50 percent by weight of acrylamide or methacrylamide and one or more other polymerizable ethylenic monomers, said interpolymer being characterized by having amido hydrogen atoms replaced by the structure

—CH$_2$OR$_1$ where R$_1$ is lower alkyl, and
(2) from about 3 percent to about 25 percent, based on the total weight of (1) and (2) herein, of a methylol phenol ether composition consisting essentially of a mixture of allyl ethers of mono-, di-, tri-methylol phenols, the trimethylolated derivatives being predominant in said methylol phenol ether composition.

9. An article having a surface containing an adherent cured layer of the coating composition of claim 1.

10. The article of claim 9 in which said surface is metal.

11. The article of claim 9 in which the cured layer of the coating composition of claim 1 is a primer and contains a superimposed layer of a different coating composition.

References Cited

UNITED STATES PATENTS

| 2,890,192 | 6/1959 | Spencer | 260—831 |
| 2,984,588 | 5/1961 | Graulich | 260—844 |
| 3,117,693 | 1/1964 | Vogel | 260—834 |
| 3,255,147 | 6/1966 | Krueger | 260—834 |
| 3,291,770 | 12/1966 | Gaylord | 260—831 |
| 3,291,856 | 12/1966 | Tringali | 260—831 |

SAMUEL H. BLECH, Primary Examiner

P. LIEBERMAN, Assistant Examiner

U.S. Cl. X.R.

117—75, 161, 132, 72; 260—52, 72, 834, 844